United States Patent Office 3,555,388
Patented Jan. 12, 1971

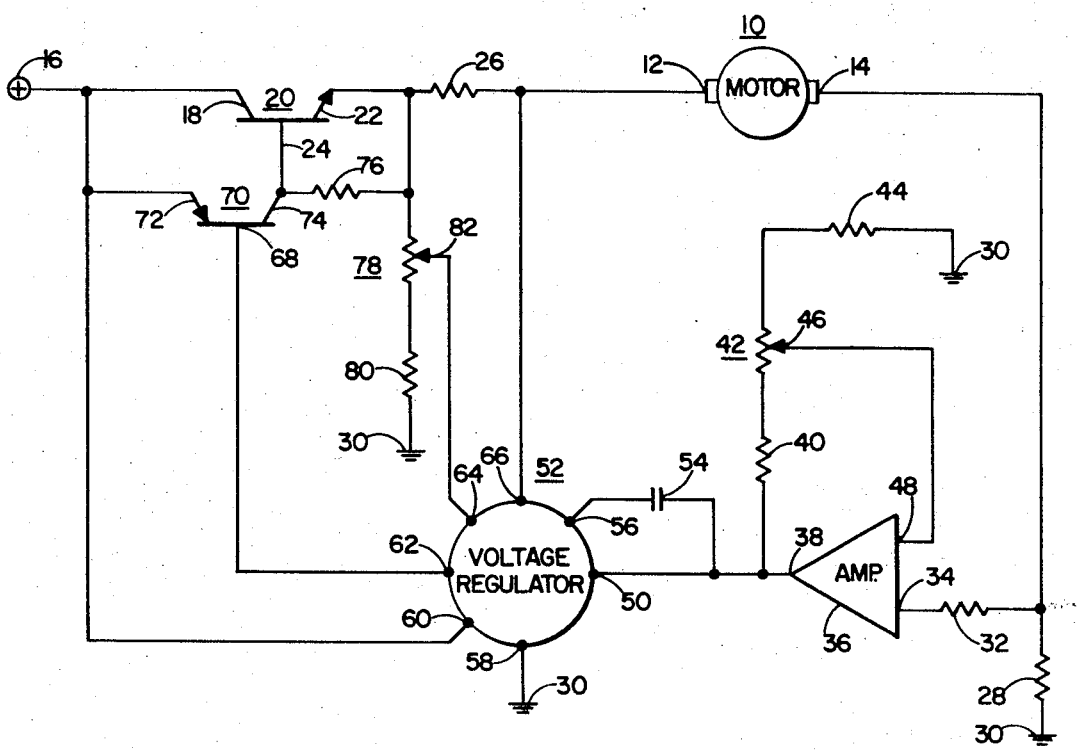

3,555,388
MOTOR SPEED CONTROL
Horton M. Rogers, Dunedin, Fla., assignor to Honeywell, Inc., Minneapolis, Minn., a corporation of Delaware
Filed Apr. 10, 1968, Ser. No. 720,114
Int. Cl. H02p 5/16
U.S. Cl. 318—332                              7 Claims

ABSTRACT OF THE DISCLOSURE

A motor speed regulator is shown wherein the speed of a direct-current motor is controlled. The load on the motor is constant and therefore its speed can be controlled simply by controlling the current through the armature winding of the motor; the voltage across the armature winding is not controlled. The armature current is sampled, providing a signal which is then amplified and applied to a voltage regulator. The output of the regulator controls a transistor in series with the armature winding. The motor speed is controlled by varying the amplification of the signal applied to the voltage regulator.

SUMMARY OF THE INVENTION

This invention relates to motor speed controls and more specifically to apparatus for controlling the speed of a direct-current motor by controlling the armature winding current.

The prior art schemes for controlling motor speed generally involve complex circuitry which controls both the armature voltage and the field current. Both variables must be controlled if the motor speed is to be controlled when the motor is providing variable torques to a load. However, such schemes become unduly complex when the motor is driving a constant load so that a constant torque is being provided by the motor.

This invention greatly simplifies the control of a constant-load, direct-current motor. This invention results from the discovery that it is only necessary to control the armature current (and not the armature voltage) to control the speed of a direct-current motor which is driving a constant load. This invention is in contrast to the prior art which generally shows controlling the voltage across the armature winding (but not controlling the current through the winding) and further controlling the field current.

A second advantage of this invention over the prior art is that in the feedback network a variable gain amplifier is used to provide a variable speed for the motor.

A third advantage is that a maximum limit on the armature current is provided thereby providing a maximum speed limit for the motor. This maximum current limit is variable so that it can be adjusted depending upon the use to which the motor is put.

This invention, besides controlling the armature current, also stabilizes that current. The prior art technique of stabilizing motor or armature current is to place a resistor in series with the armature winding. The resistor must have a large resistance compared to the armature winding impedance so that the total impedance presented to the voltage source is largely controlled by the resistor. If this resistor is sufficiently large, the armature impedance becomes negligible and the current is essentially constant. This method of stabilizing the armature current has three major disadvantages. First, the use of a large series resistor requires a higher voltage source to maintain the armature current at a sufficient level. Second, the large resistor dissipates more power and reduces the electrical efficiency of the motor and control circuit. Third, the response of the motor to a transient by either the source voltage or the motor load is unsatisfactory. The motor response to the transient is a damped sinusoid which asymptotically approaches steady state.

In this invention the active regulator largely overcomes these disadvantages since the armature current is stabilized without the use of a large resistor and the attendant disadvantages of a large source voltage and high power dissipation. Furthermore, the transient response of the motor is greatly improved because the active regulator is able to damp out the transient response much more rapidly.

These advantages and other advantages and objects of this invention will become evident to those skilled in the art upon a reading of this specification and the appended claims in conjunction with the drawing of which the single figure is a schematic representation of one embodiment of this invention.

DETAILED DESCRIPTION OF THE INVENTION

In the figure the number 10 generally designates a direct-current motor. Motor 10 has an armature winding with an input 12 and an output 14. An input terminal 16 is adapted to be connected to a potential source which may be a positive unregulated DC source. Terminal 16 is connected to a collector 18 of a control means of transistor 20 which further has an emitter 22 and a base 24. Emitter 22 is connected through a current sensing means or resistor 26 to input 12 of the armature winding of motor 10. Resistor 26 is preferably a very small current sensing resistor.

The output terminal 14 of the armature winding of motor 10 is connected by means of a current sensing means or resistor 28 to a common conductor 30 which is shown as ground. Resistor 28 is preferably a small current sensing resistor. Terminal 14 is further connected through a resistor 32 to an input 34 of an amplifier 36. Amplifier 36 has an output 38 which is connected to one end of a resistor 40, the other end of which is connected to one end of the resistance element of a potentiometer 42. The other end of the resistance element of a potentiometer 42 is connected by means of a resistor 44 to ground 30. Potentiometer 42 has a variable wiper 46 connected to a second input 48 of amplifier 36.

Amplifier 36 together with feedback resistors 40 and 44 and potentiometer 42 generally comprises a variable gain operational amplifier.

Ouptut 38 of amplifier 36 is further connected to a terminal 50 of a regulator means or voltage regulator 52. Terminal 50 is connected by means of a capacitor 54 to a terminal 56 of voltage regulator 52. A terminal 58 of voltage regulator 52 is connected to ground 30. Source 16 is connected to a terminal 60 of voltage regulator 52. Voltage regulator 52 further has terminals 62, 64, and 66.

Terminal 62 is connected to a base 68 of a control means or transistor 70 which further has an emitter 72 and a collector 74. Source 16 is connected to emitter 72 and collector 74 is connected to base 24 of transistor 20. Collector 74 is further connected by means of a resistor 76 to emitter 22 of transistor 20. Emitter 22 is further connected by means of a series combination of a resistance element of a potentiometer 78 and a resistor 80 to ground 30. Potentiometer 78 has a variable wiper 82 which is connected to terminal 64 of voltage regulator 52. Terminal 66 of voltage regulator 52 is connected to input terminal 12 of the armature winding of motor 10.

Transistors 20 and 70 comprise a controllable means for supplying an energizing current to the armature of motor 10. Voltage regulator 52 in combination with the amplifier 36 comprises an amplifier or feedback means which has a variable gain. In this connection it should be noted that voltage regulator 52 is essentially a specialized type of amplifier. As was noted above, resistor 28 is a sensing means. Potentiometer 78 together with resistors 26 and 80 essentially comprise an adjustable means for providing a maximum limit to the magnitude of the current supplied to the armature of motor 10.

Voltage regulator 52 can be any suitable circuit which provides an output signal change between terminals 60 and 62 as a function of, or proportional to, a change in signal provided at terminal 50. Preferably the voltage regulator provides a control signal change which is a non-linear function of the armature current. However, a regulator which provides a linear control function can be satisfactorily used in some applications. It is preferred that the voltage regulator also be capable of receiving a signal such as the signal provided between terminals 64 and 66 which limits the maximum signal which can be provided between terminal 60 and 62. A circuit which will operate satisfactorily as voltage regulator 52 is an LM100 integrated circuit voltage regulator manufactured by National Semiconductor Corp.

To understand the operation of this invention, assume that a DC voltage is provided at terminal 16. Current flows from terminal 16 through transistor 20, resistor 26, the armature winding of motor 10 and resistor 28 to ground 30. Motor 10 rotates at a speed which is a function of the magnitude of the current flowing through the armature winding. The particular function depends on the motor characteristics and its relation to the mechanical load. This same current flows through resistor 28 where a voltage is developed proportional to the armature current. This voltage is coupled to input 34 of amplifier 36 where it is amplified and used as an input signal at terminal 50 of voltage regulator 52. Voltage regulator 52 provides an output signal at terminal 62 which is coupled to base 68 of transistor 70 to bias transistor 70. The collector potential at collector 74 of transistor 70 biases base 24 of transistor 20 thereby controlling the magnitude of the current supplied to the armature of motor 10.

If the armature current is too small to provide the proper motor speed, the voltage developed across resistor 28 will similarly be too small. Thus, the output signal at output 38 of amplifier 36 will be amplified by voltage regulator 52 which will tend to turn transistor 70 ON. When transistor 70 conducts more current or is turned ON, the bias current to base 24 of transistor 20 is increased thereby turning transistor 20 ON or causing transistor 20 to conduct harder thereby increasing the current to armature. As the armature current increases, the voltage developed across resistor 28 increases until a condition of stability is reached.

Similarly, when excessive current is being supplied to the armature, motor 10 attains a speed which is too high and the voltage across resistor 28 will also be too large. Amplifier 36 will amplify this voltage and voltage regulator 52 will provide a signal at terminal 62 which will tend to decrease the conduction of transistor 70. Decreasing the conduction of transistor 70 decreases the conduction of transistor 20 and thereby decreasing the current supplied to the armature. In this manner the current supplied to the armature and hence the speed of motor 10 is controlled by the feedback means or amplifier means comprising amplifier 36 and voltage regulator 52.

By varying the position of wiper 46 of potentiometer 42, the gain of the operational amplifier is varied. If the gain is increased, the signal at output 38 of amplifier 36 will be larger assuming that the voltage across resistor 28 remains constant. Voltage regulator 52 will respond to this larger voltage the same as if it indicated that the speed of motor 10 was too high thereby decreasing the current through transistor 20 and hence the armature current and motor speed. Similarly, if the gain of the operational amplifier is decreased, the feedback signal at output 38 of amplifier 36 will be correspondingly decreased and voltage regulator 52 will cause the current through transistor 20 to increase thereby increasing the current to the armature and increasing the motor speed.

In many applications of motors, it is imperative for the motor not to exceed some predetermined maximum speed. Since the armature current of a motor is a measure of the motor speed, the motor speed can be limited by limiting the armature current. This limit is provided by sensing the current through resistor 26 and applying a fraction of the sensed voltage between terminals 64 and 66 of voltage regulator 52. When the maximum current is reached, the voltage between terminals 64 and 66 will be at some predetermined level. As was explained above, when this predetermined level is reached, the output signal between terminals 60 and 62 is limited so that it cannot increase thereby limiting the current through transistor 20. Since a different maximum motor speed may be desired for different applications, potentiometer 78 is provided to vary the percentage of the voltage across resistor 26 which is applied between terminals 64 and 66 of voltage regulator 52. Thus, potentiometer 42 provides a variable current to the motor and hence a variable motor speed and potentiometer 78 provides a maximum limit for the current and hence a maximum limit of the motor speed.

The response of the motor to the transients either in the source voltage or in the motor load is largely controlled by the response time of the control circuit and particularly by the response of voltage regulator 52. The response of voltage regulator 52 can be adjusted by adjusting the value of the compensation capacitor 54. The value of capacitor 54 is determined by the motor characteristics and load and by the desired response time of voltage regulator 52. Any desired transient response can be obtained, within broad limits, by adjusting capacitor 54.

While I have shown and described one embodiment of my invention, those skilled in the art will realize that many modifications can be made within the spirit and scope of my invention. Accordingly, I do not wish to be limited by the specific embodiment shown and described but only by the scope of the appended claims.

I claim as my invention:
1. Control apparatus comprising, in combination:
a motor having an armature winding;
controllable means connected to said motor for supplying an energizing current to said armature winding;
sensing means for providing a signal indicative of the magnitude of said energizing current; and
variable gain amplifier means connected between said sensing means and said controllable means, said amplifier means providing a signal to said controllable means for maintaining said energizing current substantially constant and variations of the gain of said amplifier means operating to change the magnitude of said energizing current, wherein said variable gain amplifier means includes an operational amplifier having a variable feedback and means for regulating an output signal from said operational amplifier, said operational amplifier being connected to receive a signal from said sensing means and said means for regulating an output signal from said operational amplifier being connected to provide the regulated output signal to said controllable means.

2. Apparatus as defined in claim 1 wherein said controllable means includes means for supplying an energizing potential and variable control means connected between said means for supplying an energizing potential and said armature winding whereby said variable control means controls the magnitude of the current flowing therethrough in accordance with the signal from said means for regulating the output signal of said operational amplifier means.

3. Apparatus as defined in claim 1 wherein said means for regulating the output signal from said operational amplifier includes adjustable means for providing a maximum limit to the magnitude of said energizing current, said adjustable means being adjustable to vary the maximum magnitude of said energizing current.

4. Motor control apparatus comprising, in combination:
- a motor wherein a current flowing through said motor causes said motor to rotate at a speed which is a function of said current;
- controllable means connected to said motor for supplying an energizing current thereto;
- sensing means connected to said motor for providing a signal indicative of the magnitude of said energizing current; and
- variable gain feedback means connected to receive the signal from said sensing means and connected to provide a signal to said controllable means for controlling the magnitude of said energizing current to keep the magnitude of said energizing current substantially constant whereby the speed of said motor is also maintained substantially constant, the gain of said feedback means being variable to change the magnitude of said energizing current whereby the speed of said motor is also changed in accordance with said function, wherein said variable gain feedback means includes an operational amplifier means having a variable feedback and means for regulating the output signal from said operational amplifier means, said operational amplifier means receiving the signal from said sensing means and said means for regulating providing the signal to said controllable means.

5. Motor control apparatus as defined in claim 4 wherein said motor has an armature winding, said controllable means includes a transistor means in series with the armature winding of said motor, and said sensing means includes a current sensing resistor in series with said armature winding whereby the conduction of said transistor means control the magnitude of said energizing current supplied to said armature winding.

6. Motor control apparatus as defined in claim 5 wherein said means for regulating the output signal from said operational amplifier includes adjustable means for providing a maximum limit to the magnitude of said energizing current, said adjustable means being adjustable to vary the maximum magnitude of said energizing current.

7. Motor control apparatus comprising, in combination:
- a motor having an armature winding;
- a source of energizing potential;
- transistor means connected between said source and said armature winding;
- current sensing means connected to said armature winding for providing a signal proportional to the current flowing through said armature winding;
- variable gain amplifier means connected to said current sensing means for receiving said signal therefrom;
- means for regulating the output signal of said amplifier means, providing a control signal in accordance with a signal from said amplifier means, the control signal applied to said transistor means control the conduction of said transistor means and regulate current flowing through the armature winding, the gain of said amplifier means being variable to control the magnitude of the current flowing through said armature winding.

References Cited

UNITED STATES PATENTS

| | | | |
|---|---|---|---|
| 3,388,307 | 6/1968 | Prapis et al. | 318—434 |
| 3,348,112 | 10/1967 | Saeli | 318—345X |
| 3,419,777 | 12/1968 | Asseo | 318—331X |

ORIS L. RADER, Primary Examiner

R. J. HICKEY, Assistant Examiner

U.S. Cl. X.R.

318—345